United States Patent
Ichiki et al.

(10) Patent No.: US 10,377,872 B2
(45) Date of Patent: Aug. 13, 2019

(54) FOAMABLE RESIN COMPOSITION AND MOLDED FOAM

(71) Applicant: BANDO CHEMICAL INDUSTRIES, LTD., Kobe-shi, Hyogo (JP)

(72) Inventors: Tomohito Ichiki, Hyogo (JP); Saki Jindai, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 0 days.

(21) Appl. No.: 15/556,561

(22) PCT Filed: Mar. 3, 2016

(86) PCT No.: PCT/JP2016/056602
§ 371 (c)(1),
(2) Date: Sep. 7, 2017

(87) PCT Pub. No.: WO2016/147883
PCT Pub. Date: Sep. 22, 2016

(65) Prior Publication Data
US 2018/0051151 A1    Feb. 22, 2018

(30) Foreign Application Priority Data
Mar. 18, 2015   (JP) .................. 2015-055193

(51) Int. Cl.
C08J 9/00   (2006.01)
C08J 9/18   (2006.01)
C08J 9/12   (2006.01)
C08J 9/34   (2006.01)

(52) U.S. Cl.
CPC .......... *C08J 9/0066* (2013.01); *C08J 9/0061* (2013.01); *C08J 9/122* (2013.01); *C08J 9/18* (2013.01);
(Continued)

(58) Field of Classification Search
CPC ................... C08J 9/0066; C08J 9/18
See application file for complete search history.

(56) References Cited

U.S. PATENT DOCUMENTS

2007/0027247 A1    2/2007   Ueda et al.
2010/0120932 A1*   5/2010   Yoshioka .............. C08J 9/0061
                                                               521/138
(Continued)

FOREIGN PATENT DOCUMENTS

JP    2004-292499    10/2004
JP    2007-246610     9/2007
(Continued)

OTHER PUBLICATIONS

"The Role of Carbon Black as a Colorant" by Isaac Drogin. Color Engineering. Jul.-Aug. 1967. vol. 5, No. 4. pp. 20-31 (Year: 1967).*
Machine translation of JP 2001123000 by Iwasa et al (Year: 2001).*
Horák, Z. , Fortelný, I. , Kolařík, J. , Hlavatá, D. and Sikora, A. (2005). Polymer Blends. In Encyclopedia of Polymer Science and Technology, (Ed.). doi:10.1002/0471440264.pst276 (Year: 2005).*

* cited by examiner

Primary Examiner — Michael M Dollinger
Assistant Examiner — Christina H. W. Rosebach
(74) Attorney, Agent, or Firm — Hamre, Schumann, Mueller & Larson, P.C.

(57) ABSTRACT

The present invention provides a foamable resin composition excellent in terms of the dispersibility and moldability. The foamable resin composition containing: from 30 to 80 wt % of a polyolefin; from 3 to 40 wt % of a polylactic acid; from 1 to 20 wt % of a modified polyolefin containing a carbonyl group in a molecule; from 10 to 40 wt % of a layered silicate; and from 0.01 to 0.5 wt % of a filler, the polyolefin containing at least one of polypropylene and polyethylene, the filler having a density different from the density of the layered silicate by at least 0.20 g/cm³.

6 Claims, 1 Drawing Sheet

(52) U.S. Cl.
CPC ............ *C08J 9/34* (2013.01); *C08J 2201/03* (2013.01); *C08J 2203/06* (2013.01); *C08J 2203/08* (2013.01); *C08J 2205/044* (2013.01); *C08J 2205/046* (2013.01); *C08J 2205/052* (2013.01); *C08J 2300/16* (2013.01); *C08J 2323/06* (2013.01); *C08J 2323/12* (2013.01); *C08J 2367/04* (2013.01); *C08J 2400/104* (2013.01); *C08J 2400/16* (2013.01); *C08J 2401/02* (2013.01); *C08J 2423/06* (2013.01); *C08J 2423/12* (2013.01); *C08J 2423/26* (2013.01); *C08J 2427/18* (2013.01); *C08J 2467/04* (2013.01)

(56) References Cited

U.S. PATENT DOCUMENTS

| | | |
|---|---|---|
| 2012/0053256 A1 | 3/2012 | Chen et al. |
| 2014/0105831 A1* | 4/2014 | Gonzales ............ C11D 17/0013 424/52 |

FOREIGN PATENT DOCUMENTS

| | | |
|---|---|---|
| JP | 2009-185244 | 8/2009 |
| JP | 2012-229416 | 11/2012 |
| JP | 5446261 | 3/2014 |
| WO | 2004/099315 | 11/2004 | ns and molded foams.

FOAMABLE RESIN COMPOSITION AND MOLDED FOAM

TECHNICAL FIELD

The present invention relates to foamable resin compositions and molded foams.

BACKGROUND ART

Molded foams are typically obtained by causing a resin composition to foam, and can be reduced in weight and cost and made resistant to heat. Molded foams are therefore used in various applications such as food containers, daily necessities, and home appliances. Especially for use in applications such as food containers, molded foams are desired to have sufficient heat resistance for heating in a microwave, for example. In addition, environmentally friendly molded foams have drawn attention, and molded foams obtained by foaming of a resin composition containing a mixture of a polyolefin and a polylactic acid, for example, have been studied.

For example, Patent Literature 1 discloses a polylactic acid foam of beautiful appearance excelling in heat resistance and having satisfactory mechanical properties obtained by blending polylactic acid, a polyolefin resin, and a vinyl-carboxylate-modified polyolefin resin at a certain ratio. Patent Literature 2 discloses a molded foam having high softness, high flexibility, and excellent foamed cell state obtained by foam molding, with a foaming agent, a resin composition containing an aliphatic polyester, a polyolefin, and a functional group-containing hydrogenated diene polymer.

CITATION LIST

Patent Literature

Patent Literature 1: JP 5446261 B
Patent Literature 2: JP 2012-229416 A

SUMMARY OF INVENTION

Technical Problem

For molded foams, uniform distribution of air bubbles formed by foaming (hereinafter, also referred to as "foamed particles") inside the molded foams is important. Non-uniform distribution of foamed particles leads to defects on the surfaces of molded foams and a decrease in the strength of molded foams, for example. In order to achieve a uniformly foamed state in a molded foam, the resin composition before foaming needs to be in a uniformly dispersed state. However, uniform dispersion is difficult to achieve in the case of using incompatible polymers which do not dissolve in each other, such as a polyolefin and a polylactic acid. Further studies were therefore needed to improve the dispersibility concerning the resin composition.

Solution to Problem

The inventors have made studies on the process for obtaining an environmentally friendly molded foam using a polylactic acid which is a biomass polymer. The inventors have then focused on the interface between incompatible polymers which do not dissolve in each other because such an interface is highly effective as a point where foaming starts. As a result, the inventors have found that dispersing a polylactic acid in a polyolefin, which are incompatible with each other, enables a molded foam in an excellent foamed state. A molded foam in an excellent foamed state can contain a large number of foamed particles having a small particle diameter generated inside the molded foam. In addition, with improved dispersibility concerning a polyolefin and a polylactic acid, the foamed particle diameter of the foamed particles can be made even smaller, whereby the resulting molded foam exhibits enhanced heat resistance.

In order to further improve the dispersibility concerning a polyolefin and a polylactic acid, the inventors have given consideration to forming an interface between the polyolefin and the polylactic acid by combination use of a modified polyolefin containing a carbonyl group in a molecule as a compatibilizer. The inventors have also made various studies, and have found that adding a layered silicate enhances the shear force during blending, eventually improving the dispersibility concerning a polyolefin and a polylactic acid.

Meanwhile, the inventors have found that a layered silicate, when added in too large an amount, reacts with the compatibilizer to rather deteriorate the dispersibility concerning a polyolefin and a polylactic acid. As a result of intensive studies to solve this problem, the inventors have found that the dispersibility concerning a polyolefin and a polylactic acid can be improved by adding a very small amount of a filler to the resin composition without addition of such an excessive amount of a layered silicate. This effect was found to be especially high in the case of using a filler having a density different from that of the layered silicate by at least 0.20 g/cm$^3$. Thereby, the inventors have completed the present invention.

The foamable resin composition of the present invention contains: from 30 to 80 wt % of a polyolefin; from 3 to 40 wt % of a polylactic acid; from 1 to 20 wt % of a modified polyolefin containing a carbonyl group in a molecule; from 10 to 40 wt % of a layered silicate; and from 0.01 to 0.5 wt % of a filler, the polyolefin containing at least one of polypropylene and polyethylene, the filler having a density different from the density of the layered silicate by at least 0.20 g/cm$^3$.

The molded foam of the present invention is obtained by foam molding the foamable resin composition of the present invention.

The molded foam is preferably obtained by blending the foamable resin composition and a supercritical fluid and making the resulting mixture foam.

The molded foam is preferably obtained by injection molding the foamable resin composition.

Advantageous Effects of Invention

The foamable resin composition of the present invention is excellent in terms of the dispersibility and moldability. The molded foam of the present invention, obtained by foam molding the foamable resin composition having the above-described characteristics, is excellent in terms of heat resistance, strength, and light weight.

DESCRIPTION OF EMBODIMENTS

Figure 1:
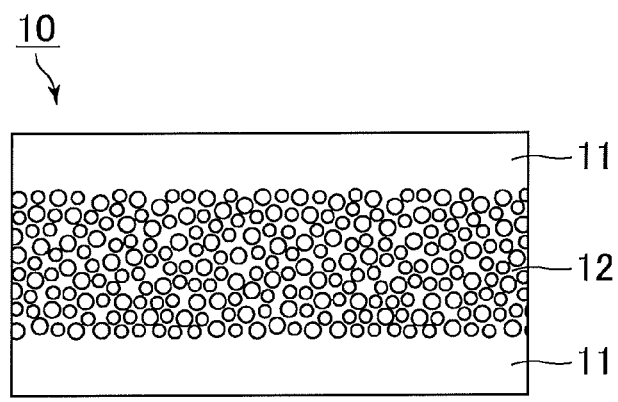
FIG. 1 is a schematic cross-sectional view of the molded foam of the present invention.

The foamable resin composition of the present invention contains: from 30 to 80 wt % of a polyolefin; from 3 to 40 wt % of a polylactic acid; from 1 to 20 wt % of a modified polyolefin containing a carbonyl group in a molecule; from 10 to 40 wt % of a layered silicate; and from 0.01 to 0.5 wt % of a filler, the polyolefin containing at least one of polypropylene and polyethylene, the filler having a density different from the density of the layered silicate by at least 0.20 g/cm³.

Since a polyolefin and a polylactic acid are incompatible with each other, blending these components does not cause them to dissolve in each other but results in formation of an interface therebetween. This interface is a point where foaming starts. A modified polyolefin containing a carbonyl group, when added to these components, can make the components compatible with each other to bring them in a better dispersion state. Yet, in the case of simply blending a polyolefin, a polylactic acid, and a modified polyolefin containing a carbonyl group, the shear force during blending is low, causing insufficient dispersion of the polylactic acid in the polyolefin. To solve this problem, a layered silicate and a slight amount of a filler are further added, so that the dispersibility concerning the polyolefin and the polylactic acid can be improved and thus points where foaming starts can be highly dispersed throughout the foamable resin composition.

The polyolefin contains at least one of polypropylene and polyethylene.

The polyolefin may contain one or both of polypropylene and polyethylene.

The polypropylene has a melt mass-flow rate (MFR) of preferably from 5 to 100 g/10 min, more preferably from 10 to 50 g/10 min. The MFR is a value measured at a temperature of 230° C. and a load of 21.2 N in accordance with JIS K7210.

The polyethylene has an MFR of preferably from 5 to 100 g/10 min, more preferably from 10 to 50 g/10 min. The MFR is a value measured at a temperature of 190° C. and a load of 21.2 N in accordance with JIS K7210.

The polyolefin may contain at least one of polypropylene and polyethylene alone, or may also contain polyolefin polymers other than polypropylene and polyethylene.

Examples of the other polyolefin species include α-olefin homopolymers, ethylene-propylene copolymers, ethylene-α-olefin copolymers, and propylene-α-olefin copolymers. Examples of the α-olefin include C4-C12 α-olefins such as 1-butene, 1-pentene, 3-methyl-1-butene, 1-hexene, 3-methyl-1-pentene, 4-methyl-1-pentene, 3-ethyl-1-pentene, 1-octene, 1-decene, and 1-undecene.

The polyolefin preferably has a melt viscosity (220° C.) of from 150 Pa·S to 400 Pa·S. The lower limit of the melt viscosity of the polyolefin is more preferably 200 Pa·S, and the upper limit thereof is more preferably 300 Pa·S. The melt viscosity can be measured with a flow tester CFT-500D available from Shimadzu Corporation, for example. Specifically, the viscosity characteristics can be evaluated by heating the resin under measurement to a given temperature to fluidize the resin, extruding the resin out of a cylinder through a capillary die (inner diameter: φ1 mm, length: 10 mm) using a piston at a given surface pressure (1 MPa), and measuring the distance and time for the piston movement.

The resin composition contains from 30 to 80 wt % of the polyolefin.

If the resin composition contains less than 30 wt % of the polyolefin, the foamable resin composition may exhibit poor fluidity, decreased solidification speed, and poor moldability. If the resin composition contains more than 80 wt % of the polyolefin, the resin composition may exhibit poor foamability to give protrusions and recesses to the surface of the resulting molded foam, spoiling the appearance. Also, in the case of blending the foamable resin composition and a supercritical fluid, the foamable resin composition is less likely to be impregnated with the supercritical fluid.

The lower limit of the amount of the polyolefin in the resin composition is preferably 35 wt %, and the upper limit thereof is preferably 70 wt %.

The polylactic acid is an L-lactic acid or D-lactic acid homopolymer, an L-lactic acid/D-lactic acid copolymer, or any mixture of such homopolymers and copolymers. Any of various polylactic acids with different crystallinities can be selected which are obtained by copolymerizing (e.g., random, block, graft copolymerizing) lactic acid enantiomers with different enantiomeric ratios or by adding a crystal nucleating agent.

The polylactic acid has a melt viscosity (220° C.) of from 150 Pa·S to 400 Pa·S. The lower limit of the melt viscosity of the polylactic acid is more preferably 200 Pa·S, and the upper limit thereof is more preferably 300 Pa·S. The melt viscosity of the polylactic acid can be measured by a similar procedure to that of measuring the melt viscosity of the polyolefin.

The resin composition contains from 3 to 40 wt % of the polylactic acid.

If the resin composition contains less than 3 wt % of the polylactic acid, the molded foam obtained by foam molding the foamable resin composition may be in an insufficiently foamed state. If the resin composition contains more than 40 wt % of the polylactic acid, the foamable resin composition may exhibit poor fluidity, decreased solidification speed, and poor moldability.

The lower limit of the amount of the polylactic acid in the resin composition is preferably 8 wt %, and the upper limit thereof is preferably 30 wt %.

With the amounts of the polyolefin and the polylactic acid within the above respective ranges, the fluidity of the foamable resin composition can be adjusted, and the foamable resin composition can exhibit favorable moldability.

The difference in melt viscosity between the polyolefin and the polylactic acid is preferably 200 Pa·S or less. The inventors have found that with a difference in melt viscosity between the polyolefin and the polylactic acid of 200 Pa·S or less, these components can be more easily blended and, further adding a layered silicate and a slight amount of a filler to these components enhances the shear force during melt blending, thereby giving favorable blending conditions for the polyolefin and the polylactic acid and improving the dispersibility. The upper limit of the difference in melt viscosity between the polyolefin and the polylactic acid is more preferably 150 Pa·S.

The process of blending polymers incompatible with each other may be a process in which a chemical bond is formed between the components or a process in which a crosslinked structure is formed between polymers of the same species. In the case of obtaining a molded foam using a polylactic acid, reactive extrusion (reactive processing) may be employed in which, for example, the composition is kneaded while a polylactic acid is synthesized using additives such as a synthetic catalyst (e.g., metal complex) and a radical generator. Since the present invention utilizes the interfaces between the polyolefin and the polylactic acid as points where foaming starts, addition of additives such as a synthetic catalyst and a radical generator to the resin composition is not necessary, unlike the reactive extrusion in which the composition is kneaded while the polylactic acid is synthesized.

Examples of the reactive extrusion of a polylactic acid include a process in which L-lactide and ε-caprolactone are reacted using tin(II) 2-ethylhexanoate serving as the synthetic catalyst and an antioxidant (e.g., IRGANOX 1010 available from Ciba Specialty Chemicals); a process in which a polylactic acid and polyethylene glycol are reacted using a radical generator such as dicumyl peroxide; and a process in which a polymer such as polycarbonate, polybutylene adipate terephthalate (PBAT), polycaprolactone (PCL), polybutylene succinate (PBS), or polybutylene succinate adipate (PBSA) is graft-polymerized onto a polylactic acid using a radical generator.

Examples of the modified polyolefin containing a carbonyl group in a molecule include those obtained by addition reaction of a polyolefin with an unsaturated carboxylic acid, an ester of an unsaturated carboxylic acid, or an anhydride of an unsaturated carboxylic acid. Examples of the unsaturated carboxylic acid include maleic acid, fumaric acid, and itaconic acid. Examples of the ester of an unsaturated carboxylic acid include monomethyl maleate, monoethyl maleate, diethyl maleate, and monomethyl fumarate. Examples of the anhydride of an unsaturated carboxylic acid include itaconic anhydride and maleic anhydride. Examples of the modified polyolefin containing a carbonyl group in a molecule include maleic anhydride-modified polyolefins and glycidyl methacrylate-modified polyolefins. These modified polyolefins containing a carbonyl group in a molecule may be used alone or in combination.

The modified polyolefin containing a carbonyl group in a molecule may be a copolymer of an olefin and a vinyl monomer. Examples of the copolymer of an olefin and a vinyl monomer include ethylene-(meth)acrylic acid copolymers, ethylene-ethyl (meth)acrylate copolymers, and ethylene-methyl (meth)acrylate copolymers. The "(meth)acrylic acid" refers to acrylic acid and methacrylic acid. Here, compounds obtained by polymerizing vinyl acetate, such as ethylene-vinyl acetate copolymers, are unsuitable especially in cases where the foamable resin composition is used in applications such as food containers, daily necessities, and home appliances because these compounds emit odor when they decompose.

The modified polyolefin containing a carbonyl group in a molecule has an MFR of preferably from 0.1 to 100 g/10 min, more preferably from 0.3 to 50 g/10 min. The MFR is a value measured at a temperature of 230° C. and a load of 21.2 N in accordance with JIS K7210.

The resin composition contains from 1 to 20 wt % of the modified polyolefin containing a carbonyl group in a molecule.

In the case where the resin composition contains the modified polyolefin containing a carbonyl group in a molecule in an amount within the above range, an interface can be formed between the polyolefin and the polylactic acid which are incompatible with each other, so that the dispersibility concerning these components can be improved. If the resin composition contains less than 1 wt % of the modified polyolefin containing a carbonyl group in a molecule, no interface may be formed between the polyolefin and the polylactic acid and thus the resulting molded foam may be in a poorly foamed state. If the resin composition contains more than 20 wt % of the modified polyolefin, odor emission, coloring, moldability deterioration, or a water absorption increase may occur.

The lower limit of the amount of the modified polyolefin containing a carbonyl group in a molecule in the resin composition is preferably 3 wt %, and the upper limit thereof is preferably 12 wt %.

Examples of the layered silicate include pyrophyllite, talc, kaolin (kaolinite), montmorillonite, apophyllite, margarite, prehnite, and mica. In particular, talc, kaolin, montmorillonite, and mica are suitable. These layered silicates may be used alone or in combination.

The resin composition contains from 10 to 40 wt % of the layered silicate.

If the resin composition contains less than 10 wt % of the layered silicate, the effect of enhancing the shear force during blending may be insufficient, and thus the polylactic acid may be insufficiently dispersed in the polyolefin. If the resin composition contains more than 40 wt % of the layered silicate, the foamable resin composition may exhibit poor moldability.

The lower limit of the amount of the layered silicate in the resin composition is preferably 15 wt %, and the upper limit thereof is preferably 35 wt %.

The filler may be any filler having a density different from the density of the layered silicate at least by 0.20 g/cm$^3$, and may be a compound different from the other components contained in the foamable resin composition, i.e., the polyolefin, polylactic acid, modified polyolefin containing a carbonyl group in a molecule, and layered silicate. The filler may be an inorganic filler formed of an inorganic material or an organic filler formed of an organic material. The filler can give sufficient aid to the dispersibility enhancing effect achieved by the addition of the layered silicate. The difference in density between the filler and the layered silicate is more preferably at least 0.25 g/cm$^3$, still more preferably at least 0.30 g/cm$^3$. The density of the filler may be higher or lower than the density of the layered silicate. The density of the filler and the density of the layered silicate can be measured by pycnometry.

Examples of the inorganic filler include fillers containing, for example, a metal oxide (e.g., magnesium oxide, calcium oxide), graphite, carbon black, molybdenum disulfide, tungsten disulfide, calcium carbonate, silica, silica gel, zeolite, boron nitride, or alumina.

Examples of the organic filler include fillers containing, for example, a fluorine resin (e.g., polytetrafluoroethylene (PTFE)), ultrahigh molecular weight polyethylene, electron beam-crosslinked polyethylene, cellulose powder, an aromatic polyamide, an aliphatic polyamide, silicon carbide, an acrylic resin, a phenolic resin, or a melamine resin. It should be noted that the ultrahigh molecular weight polyethylene and electron beam-crosslinked polyethylene cannot be numerically evaluated by the melt mass-flow rate (MFR) measurement because they have significantly low fluidity even when brought into a molten state by being heated to the melting temperature or higher.

The resin composition contains from 0.01 to 0.5 wt % of the filler.

If the resin composition contains less than 0.01 wt % of the filler, the dispersibility concerning the polyolefin and the polylactic acid and the foamed state of the resulting molded foam may be poor. If the resin composition contains more than 0.5 wt % of the filler, the resulting molded foam may be in a poorly foamed state.

The upper limit of the amount of the filler in the resin composition is preferably 0.3 wt %.

The process of producing the foamable resin composition of the present invention may be, but is not particularly limited to, a known process. Examples of the process include a process in which a mixture of components is melt-kneaded by any of various monoaxial or polyaxial extruders. The components may be kneaded batchwise, or desired components may be kneaded first and then may be kneaded together with the rest of the components.

A molded foam can be obtained by foam molding the foamable resin composition. Since the foamable resin composition contains the layered silicate and the filler and exhibits better dispersibility concerning the polyolefin and the polylactic acid, a molded foam obtained by foaming of the foamable resin composition can have fine air bubbles uniformly present inside the molded foam. The molded foam is thus excellent in terms of heat resistance, strength, and light weight.

In the case of providing random patterns, colors, or letters, for example, to the surface of the molded foam, additives such as pigment filler and a color masterbatch can be added to the foamable resin composition.

The molded foam is suitable for use in food containers, daily necessities, and home appliances. The molded foam has excellent heat resistance and passes the following JIS S2029 tests: 7.4 Heat resistance test (heat-resistant temperature on the label: 120° C.); 7.10 Test of suitability for high frequency of microwave oven; and 7.11 Test of durability in a microwave oven. Hence, food containers formed of the molded foam can be heated in a microwave or used for microwave cooking. The molded foam is also suitable for daily necessities and home appliances owing to its excellent heat resistance which prevents deformation at high temperatures.

The molded foam is preferably obtained by blending the foamable resin composition and a supercritical fluid and making the resulting mixture foam. The foamable resin composition has fine interfaces formed by bringing the polyolefin and polylactic acid not dissolving in each other into a highly dispersed state. Those interfaces serve as the foam generation points in foaming using a supercritical fluid to produce fine air bubbles uniformly inside the molded foam, so that the characteristics such as heat resistance, strength, and light weight can be sufficiently achieved. Examples of the supercritical fluid include those of inert gasses such as carbon dioxide, nitrogen, argon, and helium. In particular, supercritical fluids of carbon dioxide or nitrogen are preferred, and supercritical fluids of nitrogen are more preferred.

In the process of producing a molded foam using the supercritical fluid, the supercritical fluid is injected into the molten foamable resin composition under high pressure and the resulting mixture is stirred, so that a homogeneous molten mixture of the foamable resin composition and the supercritical fluid is obtained. The pressure is then reduced to cause a transition of the supercritical fluid in the homogeneous molten mixture to the gaseous phase, generating air bubbles. In the case where a large number of the foam generation points are uniformly present, a molded foam containing a large number of fine foamed particles is obtained. Thereby, the foamable resin composition foams, giving a molded foam containing fine foamed particles.

The molded foam is preferably obtained by extrusion molding the foamable resin composition. In particular, the molded foam is preferably obtained by a process in which the foamable resin composition is extruded while being impregnated with the supercritical fluid (hereinafter, this process is also referred to as supercritical extrusion molding). The foamable resin composition can be processed by supercritical extrusion molding into molded foams having a variety of precise shapes. In particular, foaming of the foamable resin composition in the supercritical extrusion molding is preferably conducted by a process in which the cavities of a die are filled with the foamable resin composition in a molten state, and are forcibly widened by moving part of the die before cooling and solidification proceed, whereby the pressure is rapidly reduced (hereinafter, the process is referred to as "core-back process"). The core-back process significantly increases the foaming amount.

FIG. 1 is a schematic cross-sectional view of the molded foam of the present invention. A molded foam 10 illustrated in FIG. 1 is obtained by blending the foamable resin composition of the present invention and a supercritical fluid, followed by extrusion molding the resulting mixture to cause foaming. The molded foam 10 includes a skin layer (outer skin layer) 11 on each surface of a foamed layer 12. The foamed layer 12 is a region in which foamed particles are uniformly formed, and the skin layer 11 is a region in which the foamed particles are not formed on the molded foam surface side. Since the surfaces of the molded foam 10 are the skin layers 11, the molded foam 10 can have increased strength and smooth surfaces. In addition, since the center portion of the molded foam 10 is the foamed layer 12, the molded foam 10 can be reduced in weight and in heat transfer, exhibiting enhanced heat resistance.

The molded foam preferably has a thickness of from 0.2 to 3.0 mm. If the molded foam is designed to have a thickness of smaller than 0.2 mm, the molded foam may not contain foamed particles. If the molded foam is designed to have a thickness of greater than 3.0 mm, the molded foam may have protrusions and recesses on the surfaces and have poor appearance. The foamable resin composition of the present invention, exhibiting better foamability and moldability than conventional foamable resin compositions, can give a molded foam having practically sufficient heat resistance and strength even in the case where the molded foam is designed to have a smaller thickness than conventional molded foams.

The foamed layer preferably contains 100 or more foamed particles in a 1 mm×1 mm region of the foamed layer in observation of a cross section of the molded foam. Any randomly selected 100 foamed particles preferably have an average particle size of 100 μm or smaller. The foamed particles can be measured with a scanning electron microscope (SEM) such as S-4800 available from Hitachi High-Technologies Corporation.

The blending of the foamable resin composition and the supercritical fluid and foam molding of the foamable resin composition can be conducted with, for example, an apparatus including an extrusion molding machine and a supercritical fluid generator connected to each other. Examples of the apparatus including an extrusion molding machine and a supercritical fluid generator connected to each other include a MuCell extrusion molding machine (MuCell is a registered trademark of Trexel. Co., Ltd.).

Figure 2:
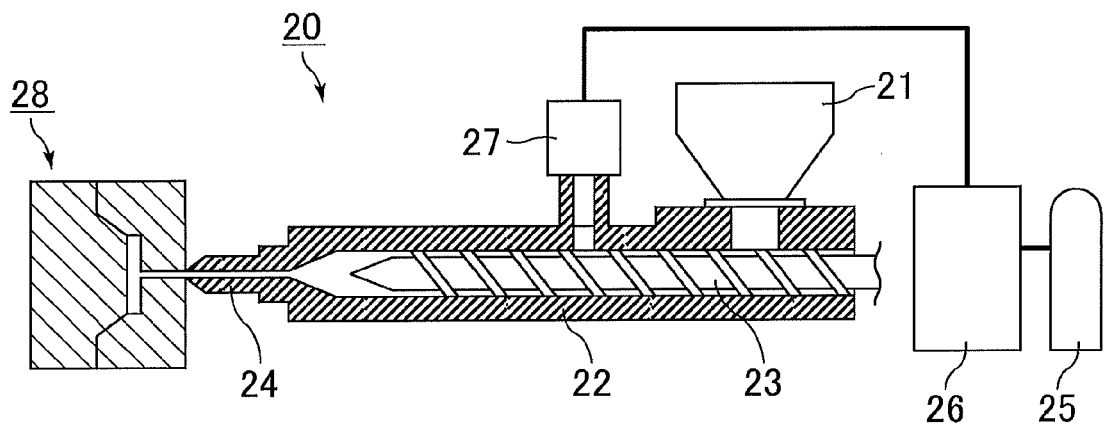
FIG. 2 is a schematic view for describing an exemplary molding apparatus used for production of a molded foam.

FIG. 2 is a schematic view for describing an exemplary molding apparatus used for production of a molded foam. As illustrated in FIG. 2, a molding apparatus 20 includes an extrusion molding machine provided with a hopper 21 into which ingredients are fed, a cylinder 22 including a screw 23, and a nozzle 24, and a gas bottle 25 and a supercritical fluid generator 26 connected to the extrusion molding machine through an injection controller 27.

The production process specifically starts by melt-blending the polyolefin, polylactic acid, modified polyolefin containing a carbonyl group in a molecule, layered silicate, and filler in a twin-screw extruder whose temperature was set to 200° C. or higher to prepare a foamable resin composition in the form of pellets. The obtained pellets of the foamable resin composition are fed into the hopper 21. The screw 23 is rotated in accordance with a common extrusion molding procedure to melt and weigh the pellets of the foamable resin composition. While the pellets of the foamable resin composition are molten and weighed, a supercritical fluid is injected into the cylinder 22 through the injection controller 27 connected to the gas bottle 25 and the supercritical fluid generator 26. The screw 23 is rotated to impregnate the molten foamable resin composition with the supercritical fluid by blending, so that a homogeneous molten mixture is obtained. The weighed homogeneous molten mixture is transferred to the nozzle 24 side with the screw 23, followed by extrusion of the mixture into a die 28. The pressure is dropped in the die, and when the pressure reaches the critical pressure, a phase transition of the supercritical fluid to the gaseous phase occurs, generating air bubbles. Also, a process can be employed in which the cavities of the die 28 are widened when the homogeneous molten mixture is extruded into the die 28 so as to accelerate the pressure drop in the die 28 and thereby increase the foaming amount.

EXAMPLES

Hereinafter, the present invention is described in more detail based on examples. The examples, however, are not intended to limit the scope of the present invention.
(Ingredients)

The ingredients used to prepare foamable resin compositions in the following examples and comparative examples are shown in Table 1.

Example 1

Polypropylene (polyolefin, 75.5 wt %), a polylactic acid (3 wt %), a modified polyolefin containing a carbonyl group in a molecule (1 wt %), talc (layered silicate, 20 wt %), and boron nitride (filler, 0.5 wt %) were dry-blended, and then kneaded with a twin-screw extruder (TEX30 available from The Japan Steel Works, Ltd.) whose temperature was set to 220° C., so that a foamable resin composition in the form of pellets was obtained. The obtained foamable resin composition contained the polylactic acid particles dispersed in polypropylene.

The obtained pellets of the foamable resin composition were fed into a supercritical extrusion molding machine (Toshiba Machine Co., Ltd.). The foamable resin composition was impregnated with the supercritical fluid while being melted at a cylinder temperature of 200° C. The resulting mixture was subjected to the core-back process through supercritical extrusion molding, and thereby a molded foam was obtained. The supercritical fluid used was of nitrogen. The filling amount thereof was 0.1 wt % and the filling pressure was 16 MPa. The molding conditions were a screw back-pressure of 15 MPa, an injection speed of 100 mm/sec, and a die temperature of 50° C. The molded foam had a plate shape with a size of 80 mm in length, 80 mm in width, and 2 mm in thickness. The filling amount of the supercritical fluid (unit: wt %) can be calculated from the following formula (1).

[(Flow rate of supercritical fluid×inlet time of supercritical fluid×conversion factor 27.8)/weight of foamable resin composition]×100    (1)

The obtained molded foam had a skin layer on each surface of the foamed layer as illustrated in FIG. 1.

Examples 2 to 14 and Comparative Examples 1 to 8

A foamable resin composition and a molded foam were produced by procedures similar to those in Example 1, except that the blending amounts of the respective ingredi-

TABLE 1

| | Compound name | Manufacturer | Product No. | Physical property |
|---|---|---|---|---|
| Polyolefin | Polypropylene | Prime Polymer Co., Ltd. | J106G | MFR (230° C.): 15 g/10 min |
| | | | | Melt viscosity (220° C.): 390 Pa · S |
| | Polyethylene | Tosoh Corporation | HDPE1000 | MFR (190° C.): 20 g/10 min |
| | | | | Melt viscosity (220° C.): 270 Pa · S |
| | Polylactic acid | Unitika Ltd. | TERRAMAC TE-2000 | MFR (190° C.): 12 g/10 min |
| | | | | Melt viscosity (220° C.): 260 Pa · S |
| | Modified polyolefin containing carbonyl group in molecule | Prime Polymer Co., Ltd. | ZP648 | MFR (230° C.): 0.6 g/10 min |
| Layered silicate | Talc | Nippon Talc Co., Ltd. | P-3 | Density: 2.70 g/cm$^3$ |
| | Mica | Ymaguchi Mica Co., Ltd. | A-21S | Density: 2.83 g/cm$^3$ |
| | Montmorillonite | Hojun Co., Ltd. | Esben W | Density: 2.55 g/cm$^3$ |
| Filler | Boron nitride (BN) | Showa Denko K.K. | UHP-1K | Density: 3.48 g/cm$^3$ |
| | Alumina | Nippon Light Metal Company, Ltd. | A21 | Density: 3.98 g/cm$^3$ |
| | Ultrahigh molecular weight polyethylene | Mitsui Chemicals, Inc. | Mipelon XM-220 | Density: 0.94 g/cm$^3$ |
| | Glass beads | Potters-Ballotini Co., Ltd. | GB731 A-PN | Density: 2.55 g/cm$^3$ |
| | Cellulose powder | Nippon Paper Industries Co., Ltd. | KC FLOCK W-50GK | Density: 1.50 g/cm$^3$ |
| | Fluorine resin (PTFE) | Solvay Specialty Polymers Japan K.K. | Polymist F284 | Density: 2.17 g/cm$^3$ | ents were changed to the amounts shown in Table 2. In Table 2, the amounts of the respective ingredients relative to the whole foamable resin composition are shown.

TABLE 2

| | Polyolefin (wt %) | | Polylactic acid | Modified polyolefin containing carbonyl group in molecule | Layered silicate (wt %) | | |
|---|---|---|---|---|---|---|---|
| | Polypropylene | Polyethylene | (wt %) | (wt %) | Talc | Mica | Montmorillonite |
| Example 1 | 75.5 | — | 3 | 1 | 20 | — | — |
| Example 2 | 34.9 | — | 15 | 10 | 40 | — | — |
| Example 3 | 34.99 | — | 40 | 10 | 15 | — | — |
| Example 4 | 49.7 | — | 20 | 10 | 20 | — | — |
| Example 5 | — | 56.5 | 15 | 8 | 20 | — | — |
| Example 6 | 29.9 | 20 | 20 | 10 | 20 | — | — |
| Example 7 | 34.9 | — | 15 | 10 | — | 40 | — |
| Example 8 | 34.9 | — | 15 | 10 | — | — | 40 |
| Example 9 | 49.7 | — | 20 | 10 | 20 | — | — |
| Example 10 | 49.7 | — | 20 | 10 | 20 | — | — |
| Example 11 | 39.9 | — | 13 | 7 | 40 | — | — |
| Example 12 | 39.5 | — | 15 | 5 | 40 | — | — |
| Example 13 | 34.99 | — | 40 | 10 | 15 | — | — |
| Example 14 | 56.5 | — | 15 | 8 | 20 | — | — |
| Comparative Example 1 | 57.7 | — | 1 | 1 | 40 | — | — |
| Comparative Example 2 | 61.7 | — | 20 | 10 | 8 | — | — |
| Comparative Example 3 | 32.5 | — | 10 | 7 | 50 | — | — |
| Comparative Example 4 | 24.99 | — | 50 | 15 | 10 | — | — |
| Comparative Example 5 | 34.9 | — | 25 | 30 | 10 | — | — |
| Comparative Example 6 | 49.7 | — | 20 | 10 | 20 | — | — |
| Comparative Example 7 | 50.0 | — | 20 | 10 | 20 | — | — |
| Comparative Example 8 | 49.3 | — | 20 | 10 | 20 | — | — |

| | Filler (wt %) | | | | | |
|---|---|---|---|---|---|---|
| | Boron nitride (BN) | Alumina | Ultrahigh molecular weight polyethylene | Glass beads | Cellulose powder | Fluorine resin (PTFE) |
| Example 1 | 0.5 | — | — | — | — | — |
| Example 2 | 0.1 | — | — | — | — | — |
| Example 3 | 0.01 | — | — | — | — | — |
| Example 4 | — | — | — | — | — | 0.3 |
| Example 5 | 0.5 | — | — | — | — | — |
| Example 6 | 0.1 | — | — | — | — | — |
| Example 7 | 0.1 | — | — | — | — | — |
| Example 8 | 0.1 | — | — | — | — | — |
| Example 9 | — | 0.3 | — | — | — | — |
| Example 10 | — | — | 0.3 | — | — | — |
| Example 11 | — | — | — | — | 0.1 | — |
| Example 12 | — | — | — | — | 0.5 | — |
| Example 13 | — | — | — | — | — | 0.01 |
| Example 14 | — | — | — | — | — | 0.5 |
| Comparative Example 1 | 0.3 | — | — | — | — | — |
| Comparative Example 2 | 0.3 | — | — | — | — | — |
| Comparative Example 3 | 0.5 | — | — | — | — | — |
| Comparative Example 4 | 0.01 | — | — | — | — | — |
| Comparative Example 5 | 0.1 | — | — | — | — | — |
| Comparative Example 6 | — | — | — | 0.3 | — | — |
| Comparative Example 7 | — | — | — | — | — | — |
| Comparative Example 8 | 0.7 | — | — | — | — | — |

(Evaluation on Foamable Resin Composition and Molded Foam)

The dispersibility and moldability of the foamable resin compositions produced in the examples and comparative examples were evaluated. Also, the foamed state and microwave suitability of the molded foams produced in the examples and comparative examples were evaluated. The results are shown in Table 3.

(1) Dispersibility Concerning Foamable Resin Composition

The dispersibility concerning the polyolefin and polylactic acid was determined by observing each foamable resin composition with a polarizing microscope (Axio Imager A1m Pol Axio Cam MRc5 available from Carl Zeiss Microscopy Co., Ltd.).

The dispersibility was evaluated as good (marked as "○") when the average particle size of the polylactic acid particles was 10 μm or smaller, and evaluated as poor (marked as "x") when the average particle size of the polylactic acid particles was larger than 10 μm.

(2) Moldability of Foamable Resin Composition

The moldability of each foamable resin composition was evaluated based on the fluidity during injection molding and the cooling and solidification after the injection molding. The composition was evaluated as good (marked as "○") when the fluidity during injection molding and the cooling and solidification after injection molding were good, and evaluated as poor (marked as "x") when the fluidity during injection molding and/or the cooling and solidification after injection molding was/were poor.

The fluidity during injection molding was evaluated by conducting 20 injections of the foamable resin composition at an injection pressure of 100 MPa or lower. The fluidity was evaluated as good when insufficient filling did not occur, and evaluated as poor when at least one of the injections resulted in insufficient filling. The cooling and solidification after injection molding were evaluated by cooling the molded foam in a die (50° C.) for one minute, and visually observing the molded foam when the molded foam was taken out of the die. The cooling and solidification were evaluated as good when no deformation was visually observed on the molded foam, and evaluated as poor when deformation was observed. For the evaluation of the fluidity and the cooling and solidification, a die having a plate shape with a size of 80 mm in length, 80 mm in width, and 2 mm in thickness was used.

(3) Foamed State of Molded Foam

A cross section of each molded foam was observed with an SEM (S-4800 available from Hitachi High-Technologies Corporation) to determine the state of the foamed particles in the foamed layer.

The foamed state was evaluated as good (marked as "○") when observation of the cross section of the molded foam found that 100 or more foamed particles were present in a 1 mm (length)×1 mm (width) region in the foamed layer and randomly selected 100 foamed particles had an average particle size of 100 μm or smaller, and evaluated as poor (marked as "x") when the foamed particles had an average particle size of larger than 100 μm.

(4) Microwave Suitability of Molded Foam

The microwave suitability of the molded foam was tested by processes in accordance with the following JIS S2029 tests: 7.4 Heat resistance test (heat-resistant temperature on the label: 120° C.); 7.10 Test of suitability for high frequency of microwave oven; and 7.11 Test of durability in a microwave oven. The molded foam was evaluated as good (marked as "○") when it passed all the tests, and evaluated as poor (marked as "x") when it failed any of the tests.

TABLE 3

| | Foamable resin composition | | | Molded foam | | |
|---|---|---|---|---|---|---|
| | Average particle size of polylactic acid particles (μm) | Dispersibility | Moldability | Average particle size of foamed particles (μm) | Foamed state | Microwave suitability |
| Example 1 | 6.2 | ○ | ○ | 98.0 | ○ | ○ |
| Example 2 | 6.5 | ○ | ○ | 56.1 | ○ | ○ |
| Example 3 | 8.8 | ○ | ○ | 77.9 | ○ | ○ |
| Example 4 | 2.1 | ○ | ○ | 36.4 | ○ | ○ |
| Example 5 | 10.0 | ○ | ○ | 65.3 | ○ | ○ |
| Example 6 | 6.3 | ○ | ○ | 87.0 | ○ | ○ |
| Example 7 | 7.2 | ○ | ○ | 53.2 | ○ | ○ |
| Example 8 | 6.8 | ○ | ○ | 78.6 | ○ | ○ |
| Example 9 | 5.8 | ○ | ○ | 68.1 | ○ | ○ |
| Example 10 | 7.6 | ○ | ○ | 81.2 | ○ | ○ |
| Example 11 | 9.7 | ○ | ○ | 88.5 | ○ | ○ |
| Example 12 | 9.1 | ○ | ○ | 87.1 | ○ | ○ |
| Example 13 | 8.1 | ○ | ○ | 54.1 | ○ | ○ |
| Example 14 | 6.2 | ○ | ○ | 45.6 | ○ | ○ |
| Comparative Example 1 | 7.1 | ○ | ○ | 122.1 | X | ○ |
| Comparative Example 2 | 88.9 | X | ○ | 351.7 | X | X |
| Comparative Example 3 | 17.3 | X | X | 159.1 | X | X |
| Comparative Example 4 | 8.3 | ○ | X | 92.5 | ○ | X |
| Comparative Example 5 | 43.3 | X | ○ | 331.0 | X | X |
| Comparative Example 6 | 17.7 | X | ○ | 139.2 | X | X |
| Comparative Example 7 | 28.4 | X | ○ | 227.9 | X | X |

TABLE 3-continued

| | Foamable resin composition | | | Molded foam | | |
|---|---|---|---|---|---|---|
| | Average particle size of polylactic acid particles (μm) | Dispersibility | Moldability | Average particle size of foamed particles (μm) | Foamed state | Microwave suitability |
| Comparative Example 8 | 22.4 | X | ○ | 233.8 | X | X |

REFERENCE SIGNS LIST

10 Molded foam
11 Skin layer (outer skin layer)
12 Foamed layer
20 Molding apparatus
21 Hopper
22 Cylinder
23 Screw
24 Nozzle
25 Gas bottle
26 Supercritical fluid generator
27 Injection controller
28 Die

The invention claimed is:

1. A foamable resin composition comprising:
from 30 to 80 wt % of a polyolefin;
from 3 to 40 wt % of a polylactic acid;
from 1 to 20 wt % of a modified polyolefin containing a carbonyl group in a molecule;
from 10 to 40 wt % of a layered silicate; and
from 0.01 to 0.5 wt % of a filler,
the polyolefin containing at least one of polypropylene and polyethylene,
the polyolefin and the polylactic acid having a difference in melt viscosity of 200 Pa*s or less,
the layered silicate being present in an amount greater than 20 times the amount of the filler, and
the filler having a density different from the density of the layered silicate by at least 0.20 g/cm$^3$.

2. A molded foam obtained by foam molding the foamable resin composition according to claim 1.

3. The molded foam according to claim 2, obtained by blending a foamable resin composition comprising:
from 30 to 80 wt % of a polyolefin;
from 3 to 40 wt % of a polylactic acid;
from 1 to 20 wt % of a modified polyolefin containing a carbonyl group in a molecule;
from 10 to 40 wt % of a layered silicate; and
from 0.01 to 0.5 wt % of a filler,
the polyolefin containing at least one of polypropylene and polyethylene,
the polyolefin and the polylactic acid having a difference in melt viscosity of 200 Pa*s or less,
the layered silicate being present in an amount greater than 20 times the amount of the filler, and
the filler having a density different from the density of the layered silicate by at least 0.20 g/cm$^3$;
and a supercritical fluid, and making the resulting mixture foam.

4. The molded foam according to claim 2, obtained by injection molding a foamable resin composition comprising:
from 30 to 80 wt % of a polyolefin;
from 3 to 40 wt % of a polylactic acid;
from 1 to 20 wt % of a modified polyolefin containing a carbonyl group in a molecule;
from 10 to 40 wt % of a layered silicate; and
from 0.01 to0.5 wt % of a filler,
the polyolefin containing at least one of polypropylene and polyethylene,
the polyolefin and the polylactic acid having a difference in melt viscosity of 200 Pa*s or less,
the layered silicate being present in an amount greater than 20 times the amount of the filler, and
the filler having a density different from the density of the layered silicate by at least 0.20 g/cm$^3$.

5. The foamable resin compostion according to claim 1, wherein the polylactic acid is dispersed in the foamable resin composition and particles of the polylactic acid have an average particle size of 10 μm or less.

6. The molded foam according to claim 2, wherein the molded foam includes foamed particles having an average particle diameter of 100 μm or less.

* * * * *